Nov. 15, 1927.
P. GRESSER
1,648,896
LUBRICATING SYSTEM
Original Filed April 24, 1924   2 Sheets-Sheet 1
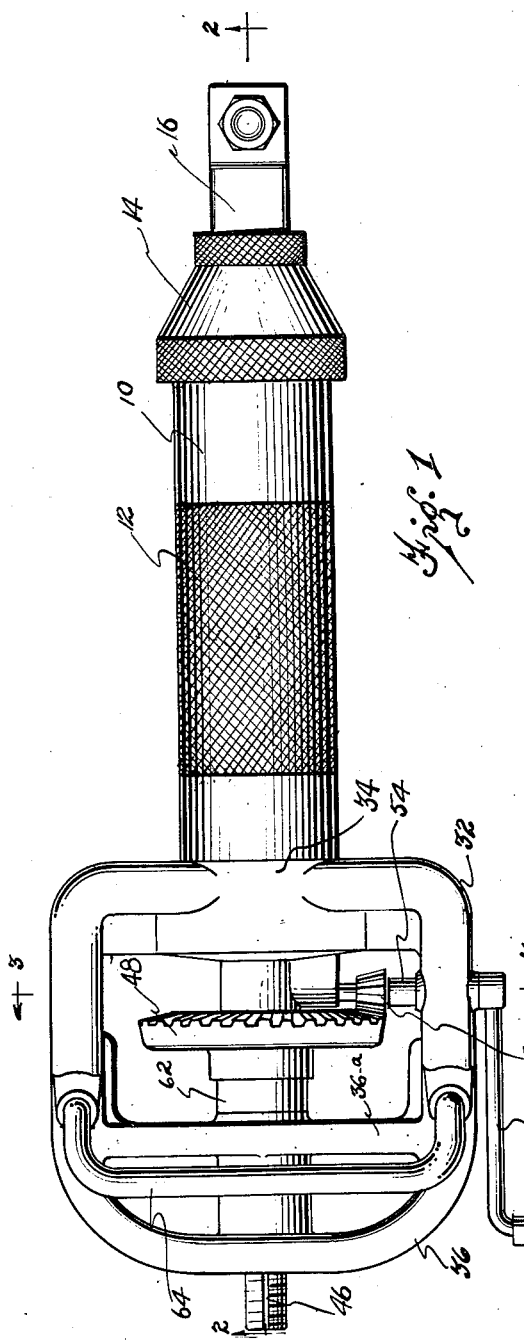
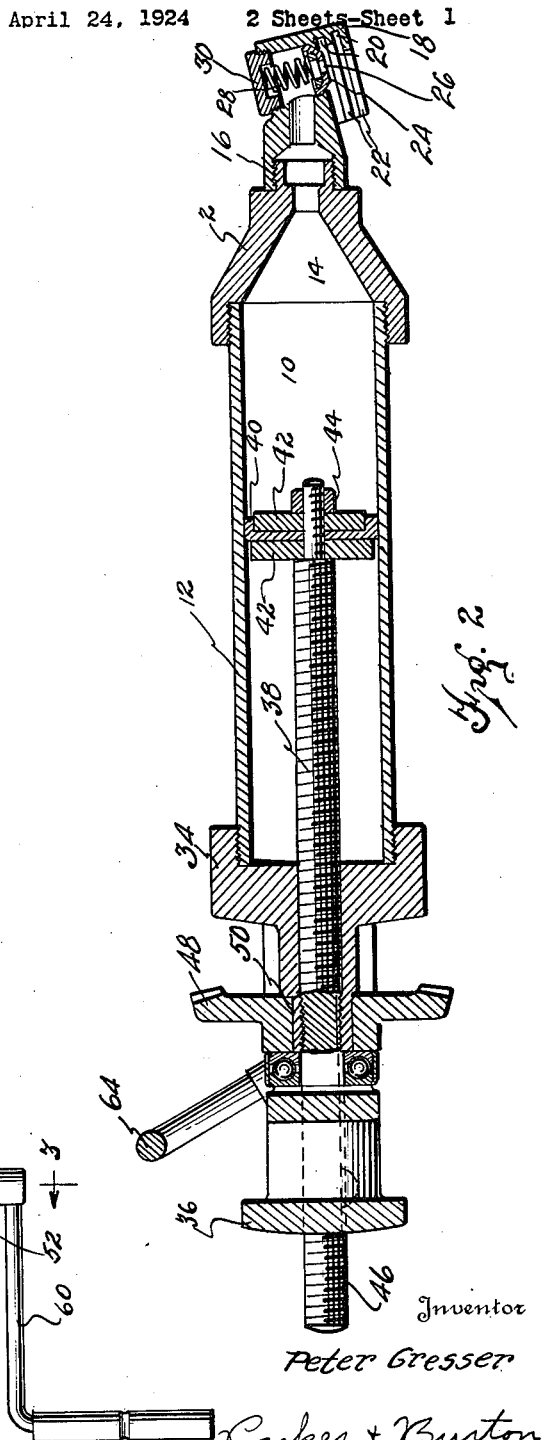
Inventor
Peter Gresser
Parker + Burton
Attorney

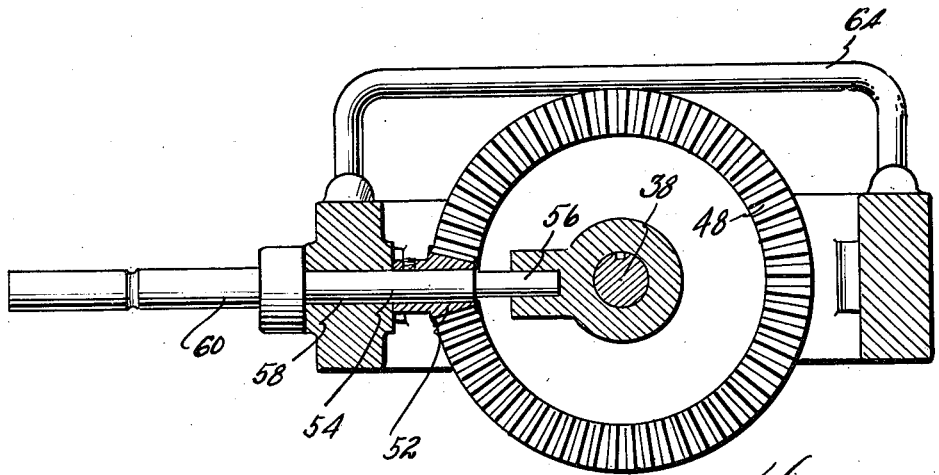
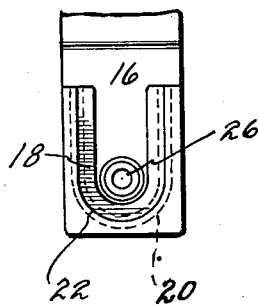
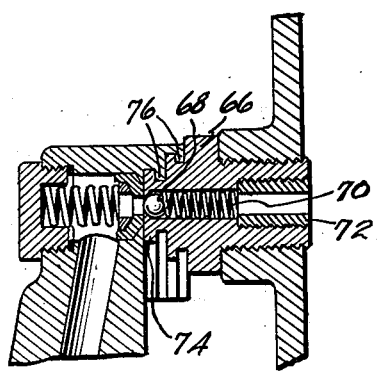

Patented Nov. 15, 1927.

1,648,896

UNITED STATES PATENT OFFICE.

PETER GRESSER, OF DETROIT, MICHIGAN.

LUBRICATING SYSTEM.

Application filed April 24, 1924, Serial No. 708,629. Renewed September 17, 1927.

My invention relates to an improved lubricating system particularly designed to dispense the heavy greases such as those which come in sticks and which are used in the lubrication of certain locomotive bearings.

This system comprises an improved high pressure manually operable gear driven grease gun by means of which a heavy grease of the character described may be easily moved, and an improved connection to detachably couple the grease gun to the receptacle to receive the discharge thereof.

An object is to provide a light, easily handled, durable, efficient grease gun, manually operable and capable of dispensing the heavy stick greases under a high pressure.

Another object is to provide a connection to detachably couple the grease gun with a receptacle to receive the discharge thereof adapted to make a tight fitting jointure between the grease gun and the receptacle and which connection is of such a character as to afford a rigid substantial support for the discharge end of the grease gun whereby the efficient, easy operation of the gun for the discharge of a heavy grease under a high pressure is facilitated.

The above objects and others will more fully appear from the following specification, accompanying drawings and appended claims.

In the drawings,—

Figure 1 is a side elevation of my improved grease gun.

Fig. 2 is a cross-sectional view taken on line 2—2, Fig. 1.

Fig. 3 is a cross-sectional view taken on line 3—3, Fig. 1.

Fig. 4 is a plan view of the nozzle of the gun.

Fig. 5 is a cross-sectional view through the nozzle and inlet to the receptacle to receive lubricant.

My improved system consists of a high pressure, manually operable, efficient grease gun which comprises a barrel 10 to contain lubricant. This barrel is threaded at each end. It is also knurled as at 12 to provide a suitable hand grip portion. A nose cap 14 is threaded on one end of the barrel. Nose caps may be provided in different lengths and shaped as desired. There is threaded on the nose cap a nozzle 16 having a discharge aperture and provided with a foot 18 having a plurality of superimposed stepped recesses 20 which alternate with corresponding superimposed stepped flanges 22 to form an engaging portion which detachably couples the nozzle with a receptacle provided with a correspondingly formed engaging portion to discharge lubricant thereinto. The nozzle is provided with a movable seat 24 having a discharge orifice 26. This seat is held by a spring 28 to yield resistingly upwardly. The opposite end of this spring bears against a removable nozzle cap 30.

There is threaded on the opposite end of the barrel a gear frame 32. This gear frame has a cap portion 34 which serves as an end closure for such end of the barrel. The gear frame has a reinforced bridge structure 36. This is shown in the drawing as consisting of a primary bridge member 36 and a secondary reinforcing bridge member indicated specifically as 36ª.

A screw-threaded plunger 38, provided with a suitable packing cup 40, held in position by a pair of retaining plates 42 and a nut 44, extends through the cap 34 of the gear frame and the bridge members thereof and projects rearwardly of the gear frame. This plunger has a keyway 46 and a key 48 mounted in the gear frame is disposed in this keyway to prevent rotation of the plunger.

To operate the plunger there is a large gear 48 which has an internal threaded bearing 50 that forms driving engagement with the threaded plunger. This gear is driven by a pinion 52 carried by a short shaft 54. One end of this shaft is journaled at 56 in the gear frame and the opposite end is journaled in a side member of the gear frame as at 58. To rotate the shaft crank 60 is provided. To take up the thrust there is a suitable thrust bearing member 62 interposed between the large gear 48 and the bridge member 36ª. The gear frame has a handle 64.

The gun is adapted to be detachably coupled with a receptacle to be lubricated. I have shown a receptacle leading to a suitable bearing. This receptacle comprises a plug 66 having an inlet opening controlled by a ball check valve 68 held to a seat therein by a spring 70. This spring is held in position by a threaded apertured plug 72 capable of adjustment to regulate the tension on the spring. This plug is removable to permit cleaning of the valve, The projecting portion of the plug is provided with a plurality of superimposed stepped flanges 74 which alternate with a corresponding plurality of superimposed stepped recesses 76. These stepped flanges and recesses are accurately formed as are the corresponding stepped recesses and flanges 20 and 22 of the nozzle which engage therewith. When the nozzle is engaged with the receptacle a rigid substantial connection between the gun and the receptacle to receive lubricant therefrom is obtained. This connection is of such a character as to rigidly support the gun to permit operation of the driving mechanism.

It is possible with this type of dispensing apparatus to easily develop very high pressure to handle the heavy stick greases. The rearwardly-projecting portion of the plunger which if rotated might easily become entangled in the clothes of the operator is held to advance without rotation so as to prevent any such entanglement if the operator leans against the end of the plunger while using the apparatus. The gun may be easily steadied with one hand when coupled with a receptacle to receive the discharge thereof so that the driving mechanism may be operated with the other hand.

What I claim is:

1. A grease gun of the class described, comprising a barrel having at one end thereof a discharge opening, a gear frame detachably secured to the opposite end of the barrel, a screw threaded plunger in the barrel extending through the gear frame, said gear frame comprising integral primary and secondary bridge elements having alined openings therein through which the screw threaded plunger extends and is mounted for longitudinal advancement, one of said bridge elements having a key fitting a spline portion of said screw threaded plunger to permit longitudinal advancement without rotation thereof, a driving gear threaded on said plunger, a thrust bearing interposed between said secondary bridge member and said driving gear, and a manually operable crank journaled in the frame and having driving engagement with the gear to rotate the same.

2. In a grease gun of the character described, a barrel having at one end a discharge opening, a gear frame provided with an integral cap portion having interior threads adapted to detachably receive one end of said barrel, a screw threaded plunger mounted in said barrel and extending through said cap structure, said gear frame comprising primary and secondary bridge elements having alined openings through which said screw threaded plunger extends, a driving gear threaded on said plunger, a manually oprable crank journaled in the frame and having driving engagement with the gear to rotate the same, and an outwardly extending handle mounted on said frame.

In testimony whereof, I sign this specification.

PETER GRESSER.